June 12, 1951 H. F. HUSTED 2,556,694
PIPE CUTTER WITH SPRING URGED PRESSURE ROLLER
Filed March 22, 1948 2 Sheets-Sheet 1
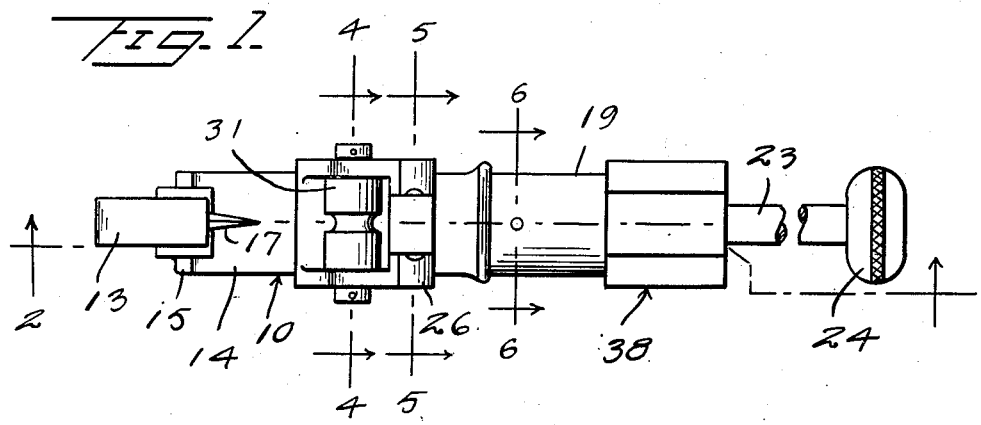
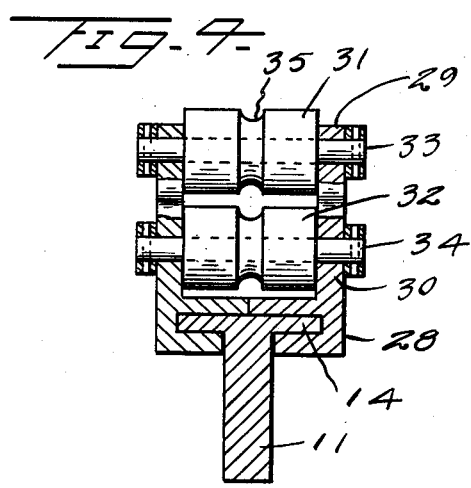
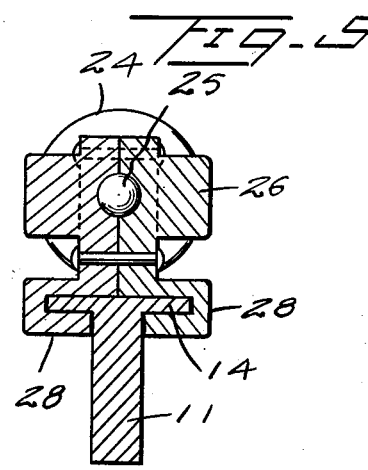
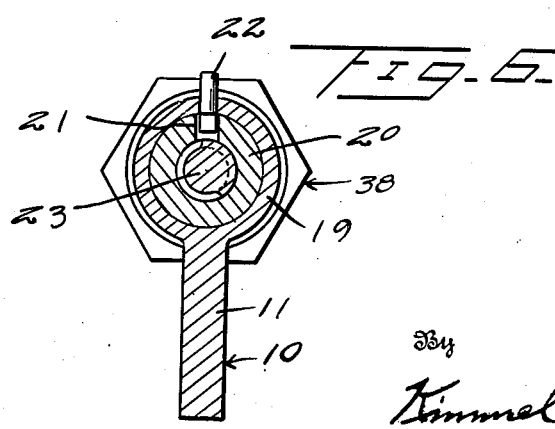
Inventor
H. F. Husted
By
Kimmel & Crowell Attorneys

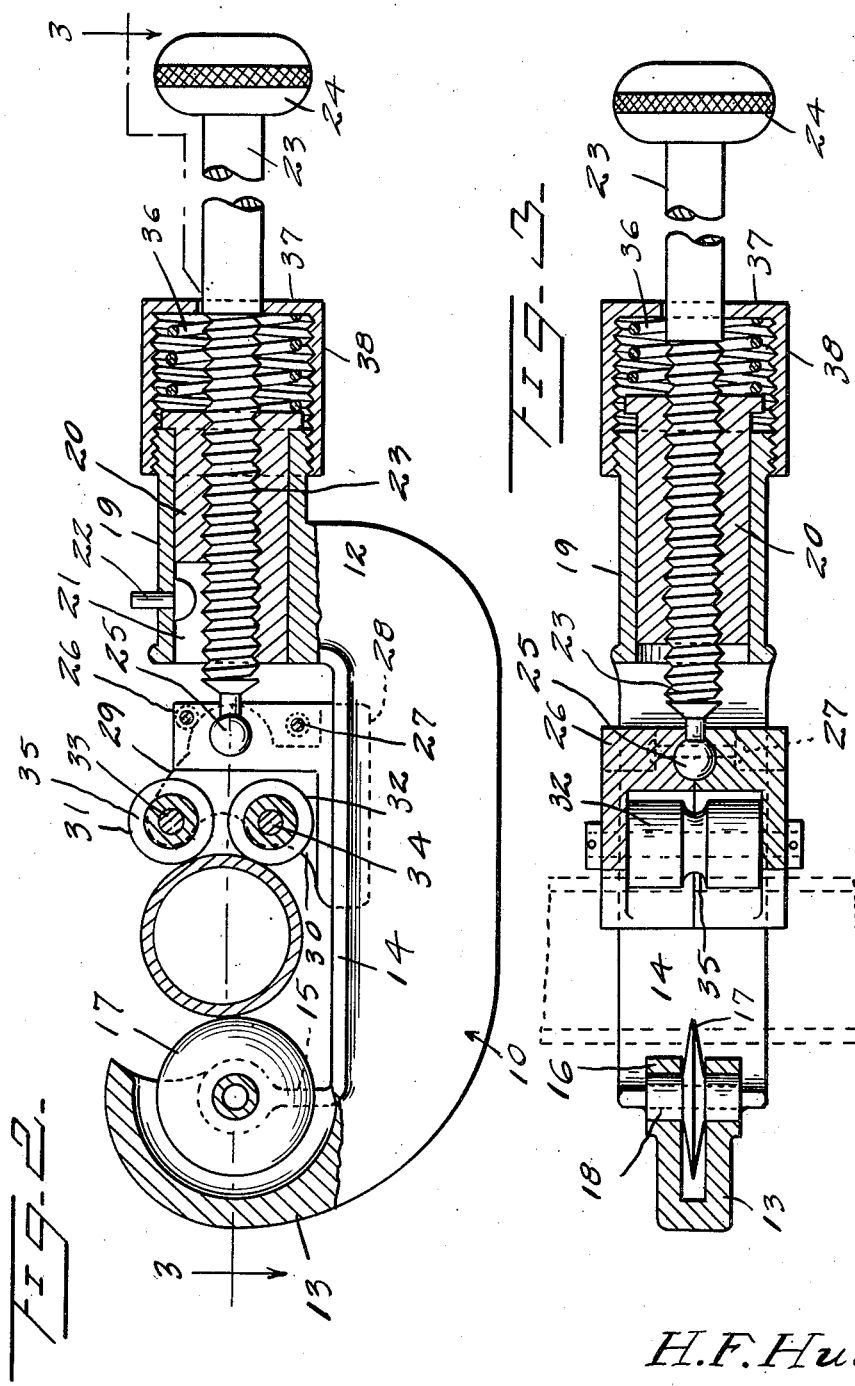

Patented June 12, 1951

2,556,694

UNITED STATES PATENT OFFICE 2,556,694

PIPE CUTTER WITH SPRING URGED PRESSURE ROLLER

Harry F. Husted, Shaverton, Pa., assignor to Har-Jo Research Corporation, Newark, N. J.

Application March 22, 1948, Serial No. 16,379

2 Claims. (Cl. 30—94)

This invention relates to pipe cutters.

In pipe cutters at present available, the rotary cutter is disposed in confronting position to a pair of pressure rollers, and pressure is applied to the rollers by a screw shaft. The screw shaft must be constantly adjusted as the cutter is operated. It is, therefore, an object of this invention to provide a pipe cutter wherein the pressure rollers are placed under spring tension, the spring being initially tensioned by adjustment of the screw shaft so that in most instances the initial tensioning of the spring will be sufficient to effect a cutting through of the pipe. In the event additional tension is required to cut the pipe, such additional tension can be obtained by means of a tension nut.

Another object of this invention is to provide a pipe cutter with spring-tensioned pressure rollers so that pipes which are out of round can be cut evenly and as readily as pipes which are round.

A further object of this invention is to provide a pipe cutter, an improved pressure roller construction wherein the rollers are formed with a peripheral groove aligning with the cutter, so that the pressure rollers will not swedge the metal back into the groove or cut which is formed by the cutter.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a plan view of a pipe cutter constructed according to an embodiment of this invention.

Figure 2 is a sectional view taken on the line 2—2 of Figure 1.

Figure 3 is a sectional view taken on the line 3—3 of Figure 2.

Figure 4 is a sectional view taken on the line 4—4 of Figure 1.

Figure 5 is a sectional view taken on the line 5—5 of Figure 1.

Figure 6 is a sectional view taken on the line 6—6 of Figure 1.

Referring to the drawings, the numeral 10 designates generally a C-shaped body member which is formed with an elongated body portion 11 and angularly disposed inner and outer end portions 12 and 13, respectively. The body portion 11 on the inner lengthwise edges thereof is formed with outwardly and longitudinally extending flanges 14 constituting guides for the slide to be hereinafter described.

The outer end member 13 is of hollow construction and the inner portion thereof includes flanges 15 extending from the forward ends of the flanges 14 and terminating in circular bosses or bearings 16. A rotary cutting wheel 17 which is formed with a hub 18 is rotatably disposed in the bearing bosses 16. The cutting wheel 17 projects into the interior of the hollow outer end portion 13 and has a substantial portion thereof projecting inwardly in the direction of the inner portion 12. The inner portion 12 includes a sleeve or longitudinally extending bushing 19 which is disposed in alignment with the center of the cutting wheel 17.

The sleeve or bushing 19 has slidably mounted therein a sleeve-like nut or slide 20 formed with a longitudinally extending slot 21 within which a key or pin 22 carried by the bushing 19 is adapted to loosely engage. The key or pin 22 holds the slide member 20 against rotary movement within the bushing 19. A screw shaft 23 is threaded through the center of the nut or slide member 20 being provided at its rear end with a knob 24. The forward end of the screw shaft 23 is reduced and formed with a substantially spherical head 25 which engages in a ball socket 26 in the form of a split block which is secured together by means of rivets or fastening members 27. The two portions of the block 26 form a slide and include guide engaging channel members 28 which engage the guides 14. The slide comprising the two portions of the block 26 is also formed with forwardly projecting arms 29 and 30 between which a pair of pressure rollers 31 and 32, respectively, rotatably engage. The pressure rollers 31 and 32 are rotatably mounted on pins 33 and 34 engaging through the arms 29 and 30, respectively, and each roller is formed with a peripheral groove 35 aligning with the cutting blade 17. In this manner when the cutting blade 17 turns up a portion of the metal of the pipe the rollers will not swedge or turn down the turned up portion of the metal.

In order to provide constant spring pressure on the slide 26 and the nut 20, I have provided a spring 36 which bears at its inner end against the outer end of the nut 20 and bears at its outer end against the outer or rear wall 37 of a spring tensioning cap 38. The cap 38 is threaded onto the inner end of the bushing 19 and when after the nut 20 has been initially tensioned by inward threading of the screw shaft 23, it is desired to place additional tension on the rollers and the slide 26, the screw cap 38 may be threaded forwardly on the bushing 19.

In the use and operation of this cutter the device is engaged about the pipe and initially the rollers 31 and 32 are tensioned by inward threading of the screw shaft 23. Inward threading of the screw shaft 23 will have the effect of moving the nut 20 outwardly or rearwardly thereby tensioning the spring 26 against the inner or rear wall 57 of the cap 38. The device may then be rotated in a conventional manner about the pipe with the cutter 17 biting into the pipe. Due to the fact that the rollers 31 and 32 are under spring tension and this spring tension is also communicated through the body of the device to the cutter 17, the pipe will be evenly cut irrespective of whether the pipe is out of round or is perfectly round. In the event that after the device has been rotated about the pipe several times the cutter has not yet cut through the pipe, additional spring tension can be applied to the cutter and the rollers either by threading the shaft 23 inwardly an additional distance or by threading the cap 38 forwardly onto the bushing 19.

I claim:

1. A pipe cutter comprising a substantially C-shaped member, a cutter rotatably carried by one end of said member, a sleeve fixedly carried by the other end of said member, an internally threaded nut slidable in said sleeve, a slide slidably carried by said member between said cutter and said sleeve, a pair of pressure rollers carried by said slide engageable against a pipe oppositely of said cutter, a screw shaft threaded through said nut, means rotatably coupling said shaft to said slide, a spring about said shaft bearing at one end against said nut, and a cap threadably carried by the rear end of said sleeve bearing against the opposite end of said spring and constituting a spring housing and spring tensioning means, inward threading of said shaft with said rollers bearing against the pipe effecting a further tensioning of said spring.

2. A pipe cutter comprising a substantially C-shaped member, a cutter rotatably carried by one end of said member, a sleeve fixedly carried by the other end of said member, an internally threaded nut slidable in said sleeve, a slide slidably carried by said member between said cutter and said sleeve, a pair of pressure rollers carried by said slide engageable against a pipe oppositely of said cutter, a screw shaft threaded through said nut, means rotatably coupling said shaft to said slide, a spring about said shaft bearing at one end against said nut, a cap threadably carried by the rear end of said sleeve bearing against the opposite end of said spring and constituting a spring housing and spring tensioning means, inward threading of said shaft with said rollers bearing against the pipe effecting a tensioning of said spring, and means carried by said sleeve coacting with said nut for holding the latter against rotation while permitting linear motion thereof.

HARRY F. HUSTED.

REFERENCES CITED

The following references are of record in the file of this patent:

UNITED STATES PATENTS

| Number | Name | Date |
| --- | --- | --- |
| 1,017,037 | Borden | Feb. 13, 1912 |
| 1,040,202 | Howe | Oct. 1, 1912 |
| 2,316,073 | Kellogg | Apr. 6, 1943 |
| 2,350,700 | Segeberg | June 6, 1944 |
| 2,360,887 | Parker | Oct. 24, 1944 |

FOREIGN PATENTS

| Number | Country | Date |
| --- | --- | --- |
| 294,892 | Germany | Oct. 31, 1916 |